Sept. 13, 1932. B. J. HASKINS Re. 18,596

MECHANISM FOR TESTING IGNITION OF AUTOMOBILES

Original Filed Feb. 18, 1928 2 Sheets-Sheet 1

Inventor
Butler J. Haskins.
By Dyrenforth Lee Chritton & Wiles
Attys.

Sept. 13, 1932. B. J. HASKINS Re. 18,596
MECHANISM FOR TESTING IGNITION OF AUTOMOBILES
Original Filed Feb. 18, 1928 2 Sheets-Sheet 2
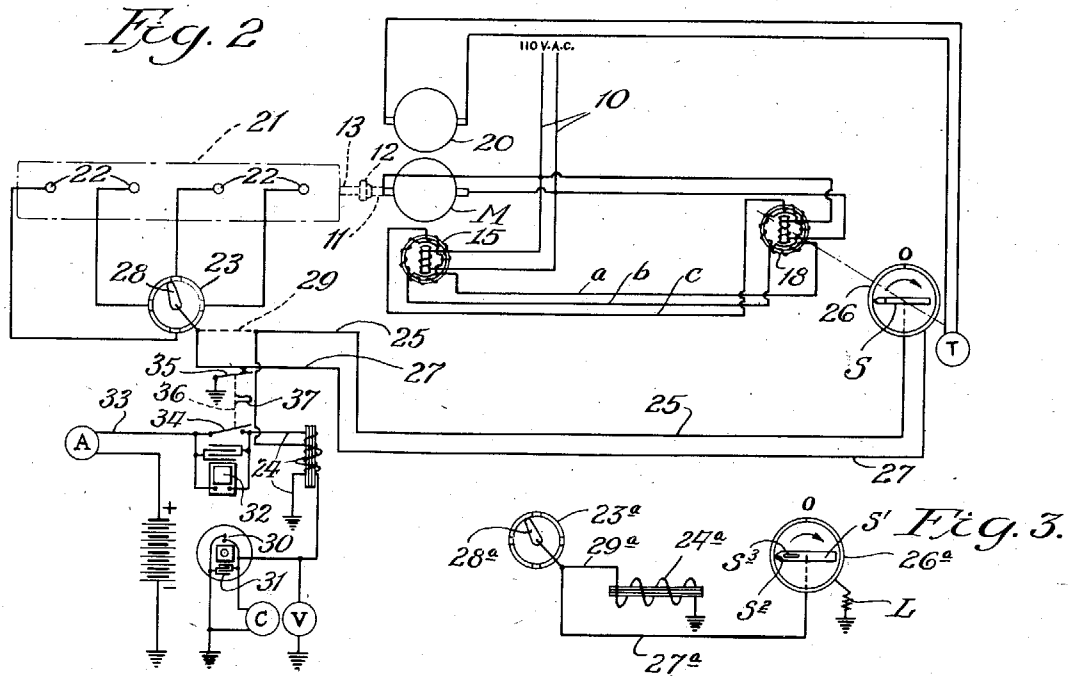
Inventor
Butler J. Haskins.
By Dyrenforth, Lee, Chritton & Wiles
Attys.

Reissued Sept. 13, 1932

Re. 18,596

UNITED STATES PATENT OFFICE

BUTLER J. HASKINS, OF CHICAGO, ILLINOIS, ASSIGNOR TO JOSEPH WEIDENHOFF, INCORPORATED, A CORPORATION OF ILLINOIS

MECHANISM FOR TESTING IGNITION OF AUTOMOBILES

Original No. 1,748,417, dated February 25, 1930, Serial No. 255,387, filed February 18, 1928. Application for reissue filed April 13, 1931. Serial No. 529,862.

This invention relates to mechanism for testing the ignition of automobiles and the like and is fully described in the following specification and shown in the accompanying drawings, in which:

Fig. 2 is a combined wiring diagram and diagrammatic view of the mechanism as a whole and of the ignition circuit of an automobile engine;

Fig. 3 is a partial view of the same showing modified form of spark protractor.

Figure 1:
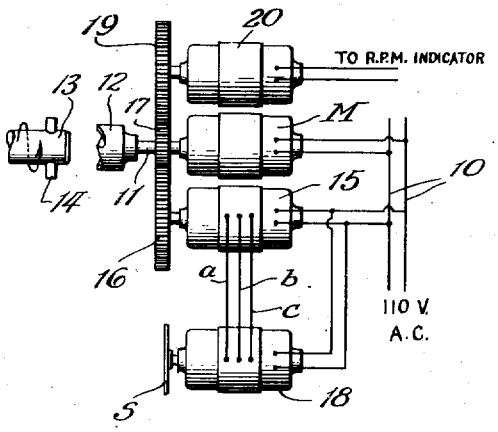
Figure 1 is a diagrammatic view of the various generators and motors and their relation to each other.

The invention consists essentially of a spark protractor indicator S which is driven at the same speed as the distributor shaft of the automobile and in exact synchronism therewith together with means for registering on this spark protractor indicator the spark of each spark plug as it occurs. This indicator, as will hereinafter appear shows not only the position of each spark for any given speed but also its intensity.

The mechanism for driving the spark protractor will now be described. It consists essentially of a motor M which is driven from a source of alternating current 10 and which has a shaft 11 at the forward end of which is a dental clutch 12 adapted to fit over the end of the engine crank shaft 13, and having ratchet teeth adapted to engage the pins 14 on the engine crank shaft. This motor is not powerful enough to drive the crank shaft of the engine but, when placed in position and started is able to follow the engine's crank shaft at all times so as to be in exact synchronism therewith.

The synchronous generator 15 has a gear 16 which meshes with a pinion 17 on the motor shaft 11 and is driven at one-half the speed of the motor M. It is electrically connected by means of three wires, *a*, *b*, *c*, with a synchronous motor 18, the generator 15 and the motor 18 being connected to the same alternating current circuit as shown in Figs. 1 and 2. The synchronous motor 18 has the spark protractor indicator S mounted on its shaft by frictional means so that the indicator S can be turned to adjust it to zero position as will later be described.

Figure 4:
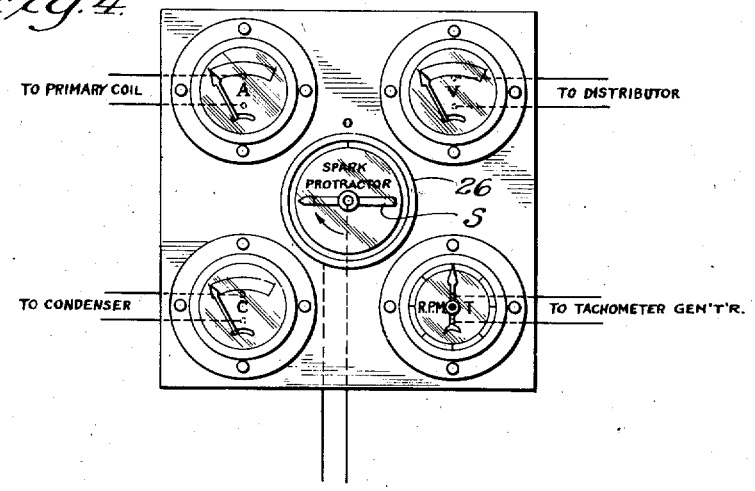
Fig. 4 is a front elevation of the instrument board of the tester.

The pinion 17 is also meshed with a gear 19 on the tachometer generator 20 and this is connected through suitable wiring to the tachometer indicator T on the instrument board (Fig. 4). This tachometer is graduated to read the speed of the engine in revolutions per minute of the engine crank shaft.

The engine block 21 is shown as provided with four spark plugs 22 which are supplied with the necessary high tension voltage through a distributor 23 which is driven at one-half the engine speed as is customary in automobile engines. This distributor is connected to the secondary coil 24 while the opposite end of this coil is connected to ground as indicated.

Where this testing mechanism can be set up near the front of the automobile so that the leads from the high tension coils 24 to the spark protractor S are quite short, the wiring is done as indicated in Fig. 2. A high tension lead 25 connects the end of the high tension coil 24 with the protractor pointer S which for this purpose is of metal and separated by an air gap of about one thirty second of an inch from the metal ring 26 which forms a housing for the indicator S, said housing being connected through a high tension lead 27 with the distributor finger 28. It is possible to thus pass the high tension current directly through the spark protractor where the protractor is located quite close to the engine so that the high tension leads 25, 27 are quite short.

Thus it will be seen that each time a spark occurs at one of the spark plugs 22, a spark simultaneously occurs between the end of the metal pointer S and the metal ring 26 and that, for any given setting of the spark advance of the distributor 23 and of the pointer S on its shaft, the spark occurring between the pointer S and the ring 26 corresponding to any one of the spark plugs 22 will always occur at the same point on the ring 26. In other words the four sparks between the pointer S and the ring 26 will be separated by 90° from each other.

In setting this apparatus the motor M and generators 15 and 20 are mounted on a frame which is adapted to be placed inside the front bumper and between the front fenders with the shaft 11 extending through the opening which is provided in all automobiles for the insertion of a hand crank. With the parts so placed, the engine having been originally turned over by hand until the desired pistons are at the top of their stroke, the finger S is then turned so that it is exactly over the zero mark at the top of the ring 26 when the motor M is in operative position upon the crank shaft 13. If now a scale is provided which reads in a clockwise direction from zero to 360° and as the engine is now started and operated in the usual way, the sparks previously described will occur at the end of the pointer S and the location of these sparks with relation to the position of the distributor finger 28 will be shown inside the ring 26. From this a very simple computation will enable the operator to tell just how many degrees ahead of dead center the spark occurs for each cylinder under any given set of operating conditions.

It will be understood that during all of this time the engine operates exactly as it does under any other idling or block test and that the speed of the engine is always under the control of the throttle and that the distributor 23 is always under the control of the spark advance lever. Advancing and retarding the spark advance lever advances or retards the position of the jump spark at the end of the pointer S. The usual lead 29 is open during this test.

The spark is caused by the usual breaker points which are a part of the distributor and are shown at 30 with the usual condenser 31 for absorbing the spark of the primary winding.

When the engine is thus operated at fairly high speed, the spark of each cylinder occurs each time at exactly the same point and these sparks, at high speed, occur so rapidly as to appear to the eye to be practically continuous. Thus a visual comparison is readily possible between the sparks of the various cylinders, and an operator accustomed to this mechanism can readily tell at a glance how each spark plug is actually performing and he can also tell whether each cylinder is getting its proper amount of charge, whether leakage past the piston ring is occurring and numerous other data of this nature.

I have also provided a means of visually examining the extent and duration of closing of the breaker points. This consists of a master vibrator 32 placed in the primary lead 33 which is interrupted by a switch 34 which is normally closed except for this test. A switch blade 35 is adapted to make contact with the high tension lead 27 between the spark protractor S and the distributor 23 and to thus ground the lead 27. The switch blades 34 and 35 are connected by an insulating bar 36 and controlled by a single handle 37. The switch 35, however, must close before the switch 34 opens.

With the engine in operation and the parts in the positions shown in Fig. 2, the operator has thrown the switch handle 37 so as to close the switch 35 and open switch 34 thereby causing a series of impulses to surge through the primary coil and produces a shower of sparks at the end of the spark protractor as long as the breaker points 30 are closed. Thus the operator can read the position of the opening and closing of these breaker points in degrees of arc on the distributor for each cylinder. The operator leaves the switch 34 open only long enough to make the observation and then closes this switch again before the engine stops. The engine is running on its own momentum while the switch 34 is open.

In Fig. 3 is shown a modified form of the device. In this the distributor 23*a* is left connected directly to the high tension winding 24*a*, but a lead 27*a* is taken from the distributor finger 28*a* to the metal ring 26*a*. Within this metal ring is mounted a finger S′ which is driven as before by a synchronous generator motor arrangement as 15, 18 shown in Fig. 2. All of the other elements of Fig. 2 may be deemed to be repeated in Fig. 3 but these are not shown therein for the sake of clearness. Their repetition appears to be needless. The lead 29*a* is closed in this circuit.

In Fig. 3 the pointer S′ is of the neon pencil type in which there is a small glass tube almost completely exhausted but containing a very small amount perhaps a millionth of atmosphere of neon gas. This pencil has a small metal tip $S^2$ connected to the end of this neon tube so that when a high tension charge is applied to the metal ring 26*a* this charge will cause the neon or other gas in the tube to glow with a color depending on the gas in the tube and this will show through a small window $S^3$ in the front of the tube.

This glowing of the neon gas is momentary and occurs at exactly the same instant that the spark occurs. Thus as the pencil S′ is rotated the glow corresponds to the spark of any one cylinder and always occurs in exactly the same place in the rotation for any given set of operating conditions. With the engine speeded up, the glowing of this gas will occur so rapidly at the position of sparking of each cylinder as to make it appear to the eye of the observer that the sparking for any given cylinder persists. In this way the observer can, with a little practice, tell what the conditions of the spark are for any given cylinder as the spark of that cylinder always occurs at exactly the same place. Thus, for a four cylinder engine as illustrated these sparks will occur 90° apart and will be advanced or retarded.

The arrangement shown in Fig. 3 permits the instrument board shown in Fig. 4 to be carried somewhat further away from the engine than is possible with the arrangement shown in Fig. 2. It will be observed that in Fig. 3 the high tension lead from the high tension coil of the distributor is not open, but that the lead 27*a* is connected thereto only at one point.

The tachometer T on the instrument board (Fig. 4) shows the speed of the engine. The ammeter A on the instrument board of Fig. 4 reads the amperage draw of the primary of the coil and the position of the ammeter in the circuit is indicated at A of Fig. 2. Likewise the voltmeter on the instrument board (Fig. 4) shows the voltage across the primary of the induction coil, its position in circuit is indicated in Fig. 2. The capacity meter C of the instrument board (Fig. 4) is connected across the two sets of plates of the condenser of Fig. 2 where its position in the wiring diagram is indicated by the letter C.

If a charge tends to build up on the ring 26*a* (Fig. 3), a high resistance leak L to ground may be used. This may be fixed or variable.

A single phase alternating current synchronous motor layout is shown herein but this has the disadvantage that the motor has a small "hunting" action. This could be almost completely eliminated by using polyphase alternating current to drive the motors and generator.

While I have shown and described but a single embodiment of this invention, it is to be understood that it is capable of many modifications. Changes therefore in the construction and arrangement may be made which do not depart from the spirit and scope of the invention as disclosed in the appended claims.

What I claim as new, and desire to secure by Letters Patent, is:—

1. Ignition testing apparatus for automobile engines, comprising a spark protractor operatively connected to the engine to rotate in synchronism therewith at any given speed thereof, and means electrically connected to the distributor for indicating visually on said protractor all of the sparks as they pass the distributor, each indication at said protractor being simultaneous with the passage of the spark through the distributor and of the same duration.

2. Ignition testing apparatus for automobile engines, comprising a spark protractor operatively connected to the engine to rotate in synchronism therewith at any given speed thereof, and means electrically connected to the distributor to be connected successively in series with the spark plugs to indicate visually on said protractor all of the sparks as they pass the distributor, each indication at the protractor being simultaneous with the passage of the spark through the distributor and of the same duration.

3. Apparatus for testing the ignition system of an internal combustion engine which has a plurality of cylinders, a spark plug for each cylinder, and a distributor, said apparatus comprising a spark protractor connected to the engine to be driven in synchronism therewith at any given speed thereof and electrically connected to said ignition system to given substantially continuously maintained visual signals of the firing of all of said spark plugs when the crank shaft of the engine is rotating, each individual flow of current in said signals being simultaneous with the corresponding flow of current through the distributor and of the same duration.

4. Ignition testing apparatus for automobile engines comprising a lay-shaft operatively connected to run at the speed of the engine crank-shaft, a spark protractor operatively connected to said lay-shaft to rotate in timed relation to the automobile distributor shaft, and means for indicating on said protractor all of the sparks as they pass the distributor and the spark plug gaps, each indication at said protractor being simultaneous with the corresponding spark at a spark plug gap and of the same duration.

5. Apparatus for testing a high tension battery ignition system which includes an induction coil having primary and second circuits, and means operatively connected to and driven in synchronism with the crankshaft of the engine and operating independently of the spark plugs for interrupting the primary circuit, said testing apparatus comprising a spark protractor driven in synchronism with said interrupting means and means connecting said spark protractor to said secondary circuit whereby it indicates visually and simultaneously all of the surges of current through said secondary circuit when said primary circuit is interrupted a plurality of times during the rotation of the crank-shaft.

6. Apparatus for testing a high tension battery ignition system which comprises an induction coil having primary and secondary windings, and means for interrupting the primary circuit to cause induced current in the secondary circuit for distribution to the spark plugs, said testing apparatus comprising a spark protractor having a scale 360° in circumference and having a movable member adapted to travel over said scale, said movable member being operatively connected to rotate in synchronism with said interrupting means, and means connected to said protractor and cooperating therewith for giving visual indications of all interruptions of said primary circuit by said interrupting means when said protractor is rotated through 360°, said indications occurring when the dying current in the primary circuit has built up the required voltage in the secondary circuit.

7. Ignition testing apparatus for an automobile engine having a jump spark ignition system including an induction coil with primary and secondary windings and means for interrupting the primary circuit, said testing apparatus comprising a protractor 360° in circumference operatively connected to said interrupting means to rotate in synchronism therewith at any given speed thereof and giving visual indications of all interruptions of said primary circuit while said induction coil forming a part thereof is left assembled with the engine, each indication occurring when the dying current in said primary circuit has built up the required voltage in the secondary winding.

8. Ignition testing apparatus for an automobile engine, said apparatus comprising a spark protractor, electrically operated means connected to the engine for driving said spark protractor in synchronism with the engine at any given speed thereof, and means electrically connected to the distributor for indicating on said protractor all of the sparks as they pass the distributor and the spark plug gaps, each indication at said protractor being made simultaneously with the spark at the corresponding spark plug gap.

In testimony whereof, I hereunto set my name, this 19th day of March, 1931.

BUTLER J. HASKINS.